(12) United States Patent
Niggemeyer

(10) Patent No.: US 9,326,349 B2
(45) Date of Patent: Apr. 26, 2016

(54) LED, TESTING METHOD AND ARTICLE

(71) Applicant: Nucon GbR, Buchholz (DE)

(72) Inventor: Jörg Niggemeyer, Buchholz (DE)

(73) Assignee: Nucon GbR, Buchholz (DE)

( * ) Notice: Subject to any disclaimer, the term of this patent is extended or adjusted under 35 U.S.C. 154(b) by 0 days.

(21) Appl. No.: 14/626,029

(22) Filed: Feb. 19, 2015

(65) Prior Publication Data

US 2015/0245429 A1    Aug. 27, 2015

(30) Foreign Application Priority Data

Feb. 21, 2014   (DE) ................... 20 2014 001 507 U
Dec. 22, 2014   (DE) ...................... 10 2014 019 434

(51) Int. Cl.
*H05B 33/08*      (2006.01)
*H05B 37/00*      (2006.01)

(52) U.S. Cl.
CPC .......... *H05B 33/089* (2013.01); *H05B 33/0815* (2013.01); *H05B 33/0824* (2013.01); *H05B 33/0845* (2013.01); *Y02B 20/346* (2013.01)

(58) Field of Classification Search
CPC ............. H05B 33/089; H05B 33/0815; H05B 33/0845
USPC ...... 315/113, 297, 209 R, 210, 186, 307, 313
See application file for complete search history.

(56) References Cited

U.S. PATENT DOCUMENTS

| | | | |
|---|---|---|---|
| 2005/0082553 A1 | 4/2005 | Yamamoto et al. | |
| 2008/0084169 A1 | 4/2008 | Wendt et al. | |
| 2010/0315019 A1 | 12/2010 | Hoogzaad et al. | |
| 2012/0194075 A1* | 8/2012 | Iwai | H05B 33/0884 315/119 |

FOREIGN PATENT DOCUMENTS

| | | |
|---|---|---|
| DE | 102006033233 A1 | 1/2008 |
| EP | 2677841 A1 | 12/2003 |
| WO | 2009095854 A2 | 8/2009 |

* cited by examiner

*Primary Examiner* — Daniel D Chang
(74) *Attorney, Agent, or Firm* — Seed IP Law Group PLLC

(57) ABSTRACT

A Light Emitting Diode (LED) driving circuit includes a reference-voltage terminal, an input terminal to receive a pulse-width modulated (PWM) power signal, and a PWM output terminal. An LED is coupled across the PWM output terminal and the reference-voltage terminal. A measurement capacitor circuit and a voltage-divider network are coupled in parallel with the LED. During an interruption of the PWM power signal, a sense node of the voltage-divider provides a voltage indicative of a temperature of the LED prior to the interruption. The voltage indicative of the temperature is used to control driving of the LED.

20 Claims, 3 Drawing Sheets

LED, TESTING METHOD AND ARTICLE

BACKGROUND

1. Technical Field

The present disclosure relates to the safe operation of at least one LED and to monitoring the junction temperature of an LED.

2. Description of the Related Art

Light emitting diodes (LEDs) have a design maximum operating junction temperature. For example, 150 degrees Celsius. Exceeding the maximum temperature reduces lifetime, light output and sudden damage of the LEDs can occur. Furthermore the efficiency of the LEDs is lower with higher temperatures and there is a small color shift of the emitted light. The temperature therefore should be monitored.

Although mounted close to LEDs, an external temperature sensor measurement will always be significantly different from the true junction temperature because it is impossible to place the sensor within a minimum space to an LED simply because of mechanical placing problems. Furthermore the thermal interfacing materials in between the sensor and an LED will create another temperature difference due to the thermal resistance of the materials when transporting the thermal power from the LED junction to the heat sink.

BRIEF SUMMARY

An embodiment facilitates determining the junction temperature of at least one LED without an additional temperature sensor, which may facilitate increasing the life time by keeping the junction temperature within desired limits.

In an embodiment, a diode temperature-dependent function is used to sense or estimate an LEDs junction temperature. It is monitored and analyzed by a digital IC, which can further control the power supply of the LEDs. In an embodiment, the current and voltage of the LEDs junction is measured, so that the LEDs temperature can be calculated, and the current and power can be kept below its operating limit.

In an embodiment, the voltage measurement is performed at a low current condition, because otherwise there will be voltage drops added which are not related to the junction itself, such as a voltage drop of the supply leads to the LEDs. If a voltage measurement is not done at low currents such measurement errors may result in errors of calculating the junction temperature.

In an embodiment, a pulse-width modulation (PWM) signal (e.g., generated by a microprocessor) dims the LEDs. The normal way is using an integrated timer module for generating a PWM signal to drive the LEDs directly or together with an external driver or IC. From full brightness to very low intensity the frequency of the PWM is set high enough, such that the human eye cannot notice flickering pulses and video capture devices can be applied without visible interference.

PWM dimming is used to fully disconnect the LEDs from the supply during intervals. When the at least one LED is turned ON the supply current should not exceed its limit.

An embodiment facilitates determining the temperature with high accuracy by recording the decreasing voltage of at least one LED at a low current (e.g., a very low current) at minimum time and effort. Within a short time, during this low current condition after the micro controller is periodically disconnecting the at least one LED from their supply, an ADC measurement is recorded. In an embodiment, a small measurement capacitor may be used to take the measurement.

Shortly, after each interrupting of the LEDs' power supply, a small discharge current through the LEDs will further decrease the voltage of the measurement capacitor, which is connected in parallel to the at least one LED, and is recorded. Substantially instantly, after interrupting the LEDs' supply, there can be added another discharge current, for instance from an inductance, which may be a part of a buck converter. At this very moment also the initial discharge of the measurement capacitor is starting from the high level of the LEDs' voltage. Thus the voltage measurement point may be taken after those peak discharge currents are passed and that the small current from the measurement capacitor is the periodical reference current.

The high precision of the micro controllers programmed periods and in addition to the preset time based measurement points and in relation to the interrupt events of the LEDs correlate with the recorded voltage to the corresponding temperature, assuming the at least one LED were kept running always under a constant voltage supply. In case the at least one LED were kept running under a constant current supply, the involved changes of the forward voltage may be corrected by another additional routine when calculating temperatures with this method.

In an embodiment, in contrast to the patent WO 2009/095854 A3, there is no second low reference current source needed, which is for this purpose toggling the LEDs, to a constant regulated low reference current source.

In an embodiment, in contrast to the state of the art there is no switch controlled change from high LEDs current to a very low reference LEDs current, instead the LEDs supply is simply interrupted for recording voltage values by means of a measuring capacitor which is being discharged through the LEDs.

In an embodiment, in contrast to the state of the art here is no constant current source, instead only an interruptible power supply is needed.

In an embodiment, a circuit comprises a passive network of components which is dimensioned in a way, that as soon as the supply is interrupted, a measuring capacitor is discharged at a high initial starting current turning quickly into a lower rate, to enable a direct measurement of the LEDs voltage, with an ADC channel under a low current condition.

In an embodiment, a Light Emitting Diode (LED) driving circuit comprises a supply circuit for one or more LEDs with the supply periodically interrupted by a micro controller unit; the LED circuit comprises: a small measurement capacitor connected in parallel to the at least one LED; a voltage divider network connected to the anode of the at least one LED feeding a voltage signal to an ADC input of the micro controller unit, which is recording the forward voltage drop of the at least one LED at a smaller forward current when turning off the supply while the measurement capacitor is discharged through the at least one LED to determine the junction temperature of the at least one LED out of the recorded voltage values. In an embodiment, the circuit comprises a small resistor connected in series with the measurement capacitor. In an embodiment, the circuit comprises an inductance with a free wheeling diode in between the at least one LED and the supply. In an embodiment, the step down regulator circuit formed by the interruptible supply the free wheeling diode and the inductance, has a small inductive value so that the discharge current of the inductance is soon dropping, that after interrupting the supply for taking a forward voltage measurement for determining the temperature, the discharge current of the inductance does not interfere with the measurement fed by the measurement capacitor mainly. In an embodiment, a semiconductor is configured to interrupt the supply of the at least one LED. In an embodiment, a signal is used for disabling a power supply control IC for interrupting the supply of the at least one LED.

In an embodiment, a switching transistor interrupts the power supply of at least one LED and a small measuring capacitor, which is connected in parallel to the at least one LED, is discharged by the at least one LED after each start of an interval. The voltage of the measuring capacitor is decreasing, starting with the LEDs operating voltage and shortly after at the beginning, with high and thereafter with low current, decreasing by the drain through the LEDs. After a short amount of time, after turning off the supply, the capacitor voltage is recorded at a small current level which a micro controller is able to determine the junction temperature.

In an embodiment, a Light Emitting Diode (LED) driving circuit comprises: a reference-voltage terminal; an input terminal configured to receive a pulse-width modulated (PWM) power signal; a PWM output terminal, wherein the PWM output terminal and the reference-voltage terminal are configured, in operation, to provide the PWM power signal to one or more LEDs; a measurement capacitor circuit coupled between the PWM output terminal and the reference-voltage terminal; a voltage-divider network coupled between the PWM output terminal and the reference-voltage terminal; and a sensed-voltage output terminal coupled to an intermediate node of the voltage divider network, and configured, in operation, to provide a voltage signal during an interruption of the PWM power signal which is indicative of a junction temperature of the one or more LEDs prior to the interruption of the PWM power signal. In an embodiment, the measurement capacitor circuit comprises a measurement capacitor coupled in series with a resistor. In an embodiment, the LED driving circuit comprises: an inductor coupled between the input terminal and the PWM output terminal; and a flyback diode coupled between the input terminal and the reference-voltage terminal. In an embodiment, the LED driving circuit comprises: a step-down regulator circuit formed by the flyback diode and the inductor, wherein the inductor has an inductance value so that the discharge current of the inductance drops to a negligible value after the interruption of the PWM power signal and the voltage indicative of the junction temperature is based on a voltage supplied to the one or more LEDs by the measurement capacitor circuit. In an embodiment, the LED driving circuit comprises: a switch configured to periodically interrupt the PWM power signal. In an embodiment, the switch is configured to control a dimming cycle of the one or more LEDs. In an embodiment, a plurality of LED driving circuits, each coupled between a PWM power supply and a respective LED of a plurality of LEDs, are configured to control the respective LEDs.

In an embodiment, a system comprises: a reference-voltage terminal; an input terminal configured to receive a pulse-width modulated (PWM) power signal; a PWM output terminal, wherein the PWM output terminal and the reference-voltage terminal are configured, in operation, to provide the PWM power signal to one or more LEDs; a measurement capacitor circuit coupled between the PWM output terminal and the reference-voltage terminal; a voltage-divider network coupled between the PWM output terminal and the reference-voltage terminal; a sensed-voltage output terminal coupled to an intermediate node of the voltage divider network; and a controller coupled to the sensed-voltage output terminal and configured, in operation, to: interrupt the PWM power signal; and generate control signals to control the PWM power signal based on a voltage sensed on the sensed-voltage output terminal after the interruption of the PWM power signal, wherein the voltage sensed on the sensed-voltage output terminal is indicative of a junction temperature of the one or more LEDs prior to the interruption of the PWM power signal. In an embodiment, the measurement capacitor circuit comprises a measurement capacitor coupled in series with a resistor. In an embodiment, the system comprises: an inductor coupled between the input terminal and the PWM output terminal; and a flyback diode coupled between the input terminal and the reference-voltage terminal. In an embodiment, the system comprises: a step-down regulator circuit formed by the flyback diode and the inductor, wherein the inductor has an inductance value so that the discharge current of the inductance drops to a negligible value after the interruption of the PWM power signal and the voltage indicative of the junction temperature is based on a voltage supplied to the one or more LEDs by the measurement capacitor circuit. In an embodiment, the system comprises: a switch configured to interrupt the PWM power signal based on one or more control signals generated by the controller. In an embodiment, the controller is configured to interrupt the PWM power signal in accordance with a dimming cycle of the one or more LEDs. In an embodiment, the system comprises: a PWM power supply coupled to the controller and the input terminal and configured to generate the PWM power signal. In an embodiment, the system comprises: one or more LEDs coupled between the PWM output terminal and the reference-voltage terminal.

In an embodiment, a method of controlling Light Emitting Diodes (LEDs), comprises: generating one or more pulse-width modulated (PWM) power signals to supply one or more LEDs; periodically interrupting the one or more PWM power signals; measuring, during a periodic interruption of the one or more PWM power signals, a voltage indicative of a junction temperature of the one or more LEDs just prior to the periodic interruption; and generating one or more control signals based on the measured voltage indicative of the junction temperature of the one or more LEDs just prior to the periodic interruption. In an embodiment, the method comprises: charging a measurement capacitor using the one or more PWM power signals; and driving the one or more LEDs using the measurement capacitor during the periodic interruption. In an embodiment, the method comprises: forming a step-down regulator circuit including an inductor and a flyback diode. In an embodiment, the periodic interrupting has a period of a dimming cycle of the one or more LEDs. In an embodiment, the generating the one or more control signals comprises generating a control signal to control a dimming cycle of the one or more LEDs. In an embodiment, the generating the one or more control signals comprises generating a control signal to control the generating of the one or more PWM power signals. In an embodiment, a non-transitory computer-readable medium's contents configure a processing device to control a method according to any of the embodiments described herein. In an embodiment, the processing device comprises an integrated circuit.

DETAILED DESCRIPTION

Figure 1:
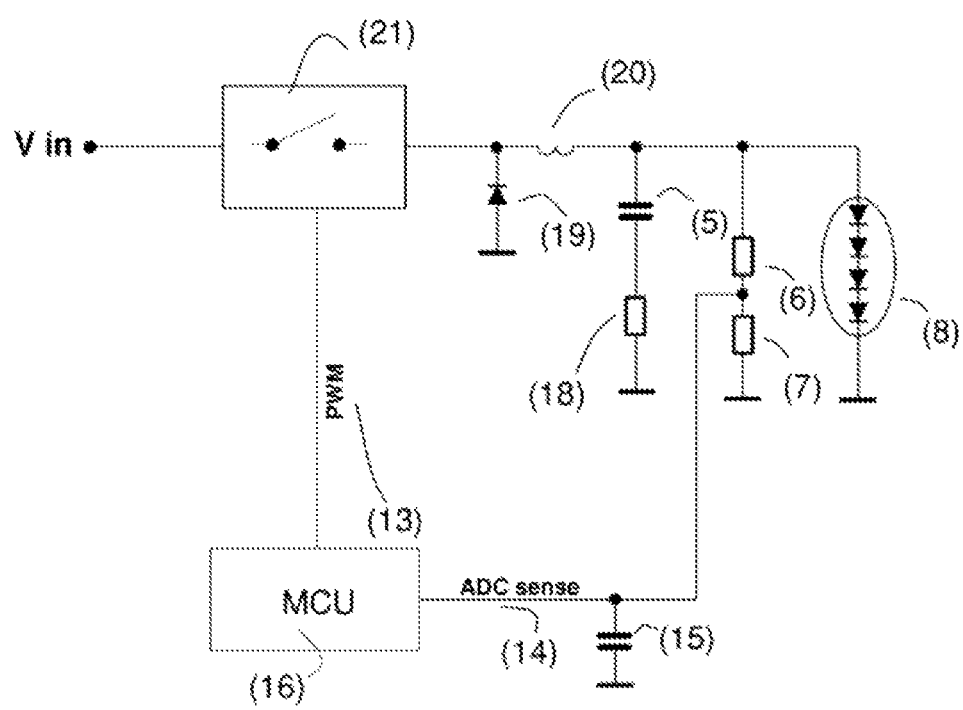
FIG. 1 is a schematic diagram of a LED driver in accordance with an embodiment.

In an embodiment as illustrated in FIG. 1, a microprocessor 16 generates a PWM signal out of a timer unit on a PWM pin 13, which deactivates periodically a variable voltage supply 21 which is connected over an inductance 20 to at least one LED 8. In parallel to the LEDs 8, a measuring capacitor 5 is coupled in series with a resistor 18.

A free-wheeling or flyback diode 19 is coupled between the common ground and a connection point of the switchable power supply 21 to the inductance 20, so this circuit arrangement is forming a basic switching step-down regulator. The switchable power supply itself can be current or voltage regulated, however limited. The LED power supply 21 is configured to supply a voltage variable to limit the current through the LEDs or to keep the current constant during the active state. The microcontroller 16 can perform the regulating and control steps for such a switching supply circuit 21, however this is an option depending on the resources of the applied controller. The controller is able to control the LEDs power and with it the light output by PWM dimming.

The task to monitor, control and limit or regulate the junction temperature of the LEDs, is not depending on the specific design of the supply circuitry 21 and microcontroller 16. When the supply is turned on, the resistor 18, in series with the measurement capacitor, limits the charging current. The resistor 18 may have a low value such that at a low discharge current over the LEDs there is no noticeable voltage drop in relation to the junction voltage of the LEDs.

As illustrated, at the midpoint of a series divider of two resistors 6, 7, connected in parallel to the LEDs, an indication of the LEDs voltage is measured and provided to an input 14 of the microcontroller 16. A small capacitor 15 is coupled between the input 14 and the common ground. The signal applied at input 14 may be subjected to analog-to-digital conversion by the microcontroller 16.

When the supply is activated, the ADC channel may optionally measure the voltage supply under the LEDs load so the microcontroller, if this is wanted, is also able to control and regulate the supply using this ADC channel. In an embodiment, the ADC channel may be used instead of or in addition to another ADC channel, and may provide a faster PWM channel output than an ADC channel used to perform PWM for the dimming.

The dimming frequency is slower than the switching frequency of a dc-dc converter. If the supply is deactivated for a longer interval, like for a periodic dimming interruption, the freewheeling diode 19 will fully discharge over the LEDs and the measurement capacitor 5 will be quickly discharged as well at a base voltage, which is from this value slowly descending with a much lower discharge current.

The decay of the following discharge current, after the supply is interrupted, depends from the values of the passive network comprising the capacitor 5 and the inductance 20. In an embodiment, the capacitance of the capacitor 5 and the inductance of the inductor 20 are sufficiently small, so the higher power current of the LEDs is relatively fast fading into a longer discharge current ramp of the capacitor 5.

Figure 2:
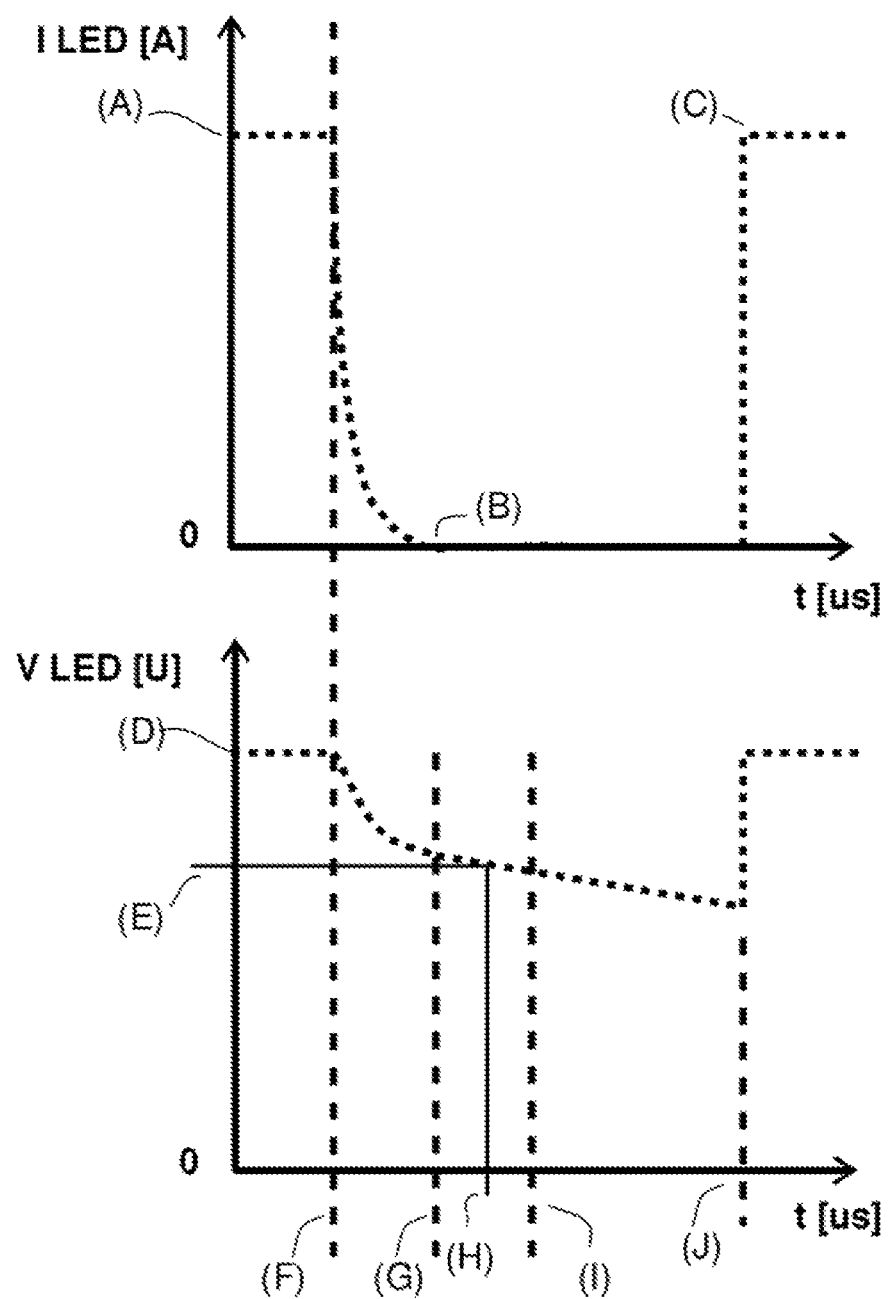
FIG. 2 graphically illustrates the current and voltage of the LED during a turn off pause.
Figure 3:
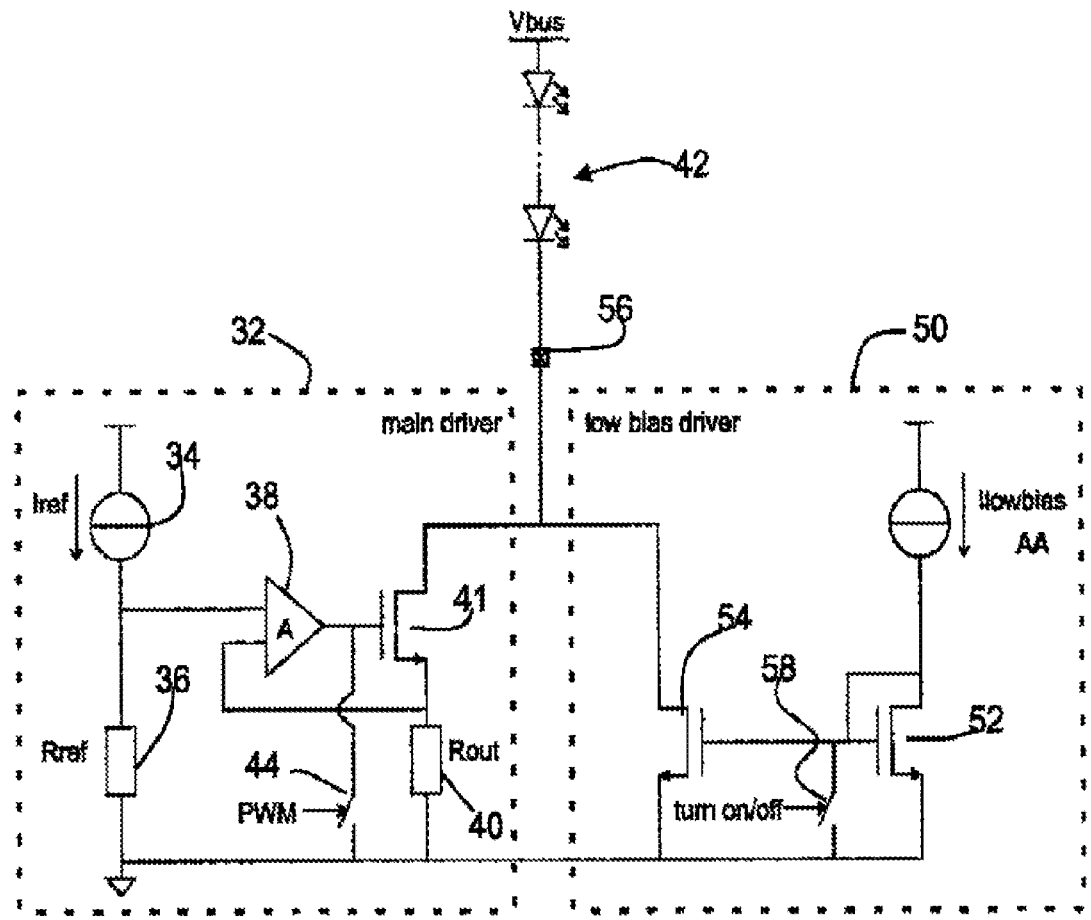
FIG. 3 shows a conventional system as shown in U.S. Patent Publication No. 2010/0315019, and is not described in detail herein.

With reference to FIG. 2, longer discharge periods for dimming are caused by interruptions of the supply triggered by the controller, which may be periodic. At a time F, the supply is interrupted. The controller (see microcontroller 16 of FIG. 1) may have the time F stored and available in its register or determine the time F based on a period of a dimming interrupt cycle. So the controller may perform periodically a voltage measurements E of the turned off LEDs on a time resolved basis, as illustrated after a time G, or can start an ADC conversion at a specific time interval after turning off, as illustrated at time H.

The controller is able to capture and control the voltage discharge of the capacitor over the LEDs on a time resolved base. Thus the controller is able to analyze the diode function on the turn off ramp like it is visible by an oscilloscope and those captured values may be stored, for example, in the RAM of the controller.

As soon as the fast discharge of the capacitor is over (B, G), the following voltage value (E), which is the beginning of the slower fading discharge ramp t>(G), is sampled.

This sampled value of is indicative of the LEDs' diode voltage at the edge of the low current condition just before the LEDs pass over into the higher conducting state of the semiconductor at time J. The corresponding resistance value of the LEDs is so high in value that all other resistance values, which are in series with the junction of the LEDs, can be neglected.

The microcontroller is configured to generate control signals based on the voltage measurement points V LED (voltage E measured at time H). For example, the microcontroller may use a look-up table stored in a memory, may execute instructions, etc., and various combinations thereof, to generate the control signal. Generating the control signal may include determining a temperature value of the junction of the LEDs. Based on the measurement and/or the determined junction temperature the microcontroller may reduce the output power of the LEDs by, e.g., reducing the dimming duty ratio.

In an embodiment, the sampling of the voltage measurements at the time H is independent of the duration F to J of the periodic break and independent of the frequency of the interruptions for dimming.

In an embodiment, when the sampled voltage is getting lower, the temperature of the LEDs is rising, since the measurement capacitor is faster discharged over the LEDs.

Because the capacitor is charged and the discharge is monitored, the micro controller is able to detect the voltage level of the diode, when it becomes conductive by a smooth rising of the voltage supply at a first initial turning on of the circuitry. As long as there is no higher measurable voltage difference in between V(D) and V(E) the supply voltage is not yet higher than the diode forward voltage of the higher conductive state.

The discharge time of the measurement capacitor can be kept short by selecting a small capacitance value and the inductance value can be selected also small in value or can be omitted depending on the type of the supply, so the frequency of the dimming can be quite high, because the minimum break time (F to H) can be kept small, e.g., in the range of about 10 micro seconds. When having the temperature monitoring running at a 1 kHz sampling rate, in an embodiment a full power steering up to 99% is possible at a fixed current pulse output of the supply.

Because the sample voltage point occurs just after the high power pulse, there is to be expected to have a good correlation to the high temperature of the junction, with any cooling in the interim being insignificant.

In an embodiment, a direct substantially non-delayed junction temperature measurement with an accuracy of about plus minus three degree Celsius without an external temp sensor and without the need of expensive component costs may be obtained. The measurement with a minimum of sampling time facilitates allowing low dimming while avoiding flickering.

In an embodiment, an LED junction temperature T may be determined based on a linear approximation, as follows, assuming the driving voltage of the LED is kept constant:

$$T_{LED} = A_{LED} - C \times V_{LEDOFF}$$

where $A_{LED}$ is an individual offset constant for a specific sample of an LED, C is a constant assumed to be the same for a set of LEDs, and $V_{LEDOFF}$ is a voltage across the LED just after the PWM power signal is turned off, which may be proportional to a voltage across a voltage divider network.

The $A_{LED}$ for an LED may be automatically calibrated by software running the LED at low dim power where the LED junction temperature is just one or two degrees centigrade higher than the environmental temperature.

Assuming the driving voltage of the LED $V_{LEDON}$ is changed, because the driving current of LED is kept constant at different LED junction temperatures, the above approximation may have a non-linear correction approximation applied depending on $V_{LEDON}$:

$$T_{LED} = A_{LED} - C \times V_{LEDOFF} - ((D_1 - V_{LEDON})B_1 + (D_2 - V_{LEDON})^2 B_2 + \ldots)$$

Constants $D_1$, $B_1$, $D_2$, $B_2$, ... are empiric constants assumed to be the same for a set of LEDs. It has been observed that approximation with a power of two is working well to keep the mathematical operations in the 8-bit range, which may be useful when employing less powerful micro controllers.

In an embodiment, the duty cycle of the PWM dimming may be adjusted based on the indication of the junction temperature and/or a determined value of the junction temperature. In an embodiment, the current/voltage of the PWM signal during the duty-on cycle may be adjusted based on the indication of the junction temperature and/or a determined value of the junction temperature. In an embodiment, the duty-on cycle of the PWM signal may be adjusted based on the indication of the junction temperature and/or a determined value of the junction temperature.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Light Emitting Diode (LED) driving circuit, comprising:
a reference-voltage terminal;
an input terminal configured to receive a pulse-width modulated (PWM) power signal;
a PWM output terminal, wherein the PWM output terminal and the reference-voltage terminal are configured, in operation, to provide the PWM power signal to one or more LEDs;
a measurement capacitor circuit coupled between the PWM output terminal and the reference-voltage terminal;
a voltage-divider network coupled between the PWM output terminal and the reference-voltage terminal; and
a sensed-voltage output terminal coupled to an intermediate node of the voltage divider network, and configured, in operation, to provide a voltage signal during an interruption of the PWM power signal which is indicative of a junction temperature of the one or more LEDs prior to the interruption of the PWM power signal.

2. The LED driving circuit according to claim 1 wherein the measurement capacitor circuit comprises a measurement capacitor coupled in series with a resistor.

3. The LED driving circuit according to claim 1, comprising:
an inductor coupled between the input terminal and the PWM output terminal; and
a flyback diode coupled between the input terminal and the reference-voltage terminal.

4. The LED driving circuit according to claim 3, comprising:
a step-down regulator circuit formed by the flyback diode and the inductor, wherein the inductor has an inductance value so that the discharge current of the inductance drops to a negligible value after the interruption of the PWM power signal and the voltage indicative of the junction temperature is based on a voltage supplied to the one or more LEDs by the measurement capacitor circuit.

5. The LED driving circuit according to claim 1, comprising:
a switch configured to periodically interrupt the PWM power signal.

6. The LED driving circuit of claim 5 wherein the switch is configured to control a dimming cycle of the one or more LEDs.

7. A system, comprising:
a reference-voltage terminal;
an input terminal configured to receive a pulse-width modulated (PWM) power signal;
a PWM output terminal, wherein the PWM output terminal and the reference-voltage terminal are configured, in operation, to provide the PWM power signal to one or more LEDs;
a measurement capacitor circuit coupled between the PWM output terminal and the reference-voltage terminal;
a voltage-divider network coupled between the PWM output terminal and the reference-voltage terminal;
a sensed-voltage output terminal coupled to an intermediate node of the voltage divider network; and
a controller coupled to the sensed-voltage output terminal and configured, in operation, to:

interrupt the PWM power signal; and generate control signals to control the PWM power signal based on a voltage sensed on the sensed-voltage output terminal after the interruption of the PWM power signal, wherein the voltage sensed on the sensed-voltage output terminal is indicative of a junction temperature of the one or more LEDs prior to the interruption of the PWM power signal.

8. The system of claim 7 wherein the measurement capacitor circuit comprises a measurement capacitor coupled in series with a resistor.

9. The system of claim 7, comprising:

an inductor coupled between the input terminal and the PWM output terminal; and a flyback diode coupled between the input terminal and the reference-voltage terminal.

10. The system of claim 9, comprising:

a step-down regulator circuit formed by the flyback diode and the inductor, wherein the inductor has an inductance value so that the discharge current of the inductance drops to a negligible value after the interruption of the PWM power signal and the voltage indicative of the junction temperature is based on a voltage supplied to the one or more LEDs by the measurement capacitor circuit.

11. The system of claim 7, comprising:

a switch configured to interrupt the PWM power signal based on one or more control signals generated by the controller.

12. The system of claim 7 wherein the controller is configured to interrupt the PWM power signal in accordance with a dimming cycle of the one or more LEDs.

13. The system of claim 7, comprising:

a PWM power supply coupled to the controller and the input terminal and configured to generate the PWM power signal.

14. The system of claim 7, comprising:

one or more LEDs coupled between the PWM output terminal and the reference-voltage terminal.

15. A method of controlling Light Emitting Diodes (LEDs), comprising:

generating one or more pulse-width modulated (PWM) power signals to supply one or more LEDs;

periodically interrupting the one or more PWM power signals;

measuring, during a periodic interruption of the one or more PWM power signals, a voltage indicative of a junction temperature of the one or more LEDs just prior to the periodic interruption; and generating one or more control signals based on the measured voltage indicative of the junction temperature of the one or more LEDs just prior to the periodic interruption.

16. The method of claim 15, comprising:

charging a measurement capacitor using the one or more PWM power signals; and driving the one or more LEDs using the measurement capacitor during the periodic interruption.

17. The method of claim 15, comprising:

forming a step-down regulator circuit including an inductor and a flyback diode.

18. The method of claim 15 wherein the periodic interrupting has a period of a dimming cycle of the one or more LEDs.

19. The method of claim 15 wherein the generating the one or more control signals comprises generating a control signal to control a dimming cycle of the one or more LEDs.

20. The method of claim 15 wherein the generating the one or more control signals comprises generating a control signal to control the generating of the one or more PWM power signals.

\* \* \* \* \*